P. MUNEY.
SOLDERING IRON.
APPLICATION FILED APR. 20, 1914.
1,155,433.
Patented Oct. 5, 1915.
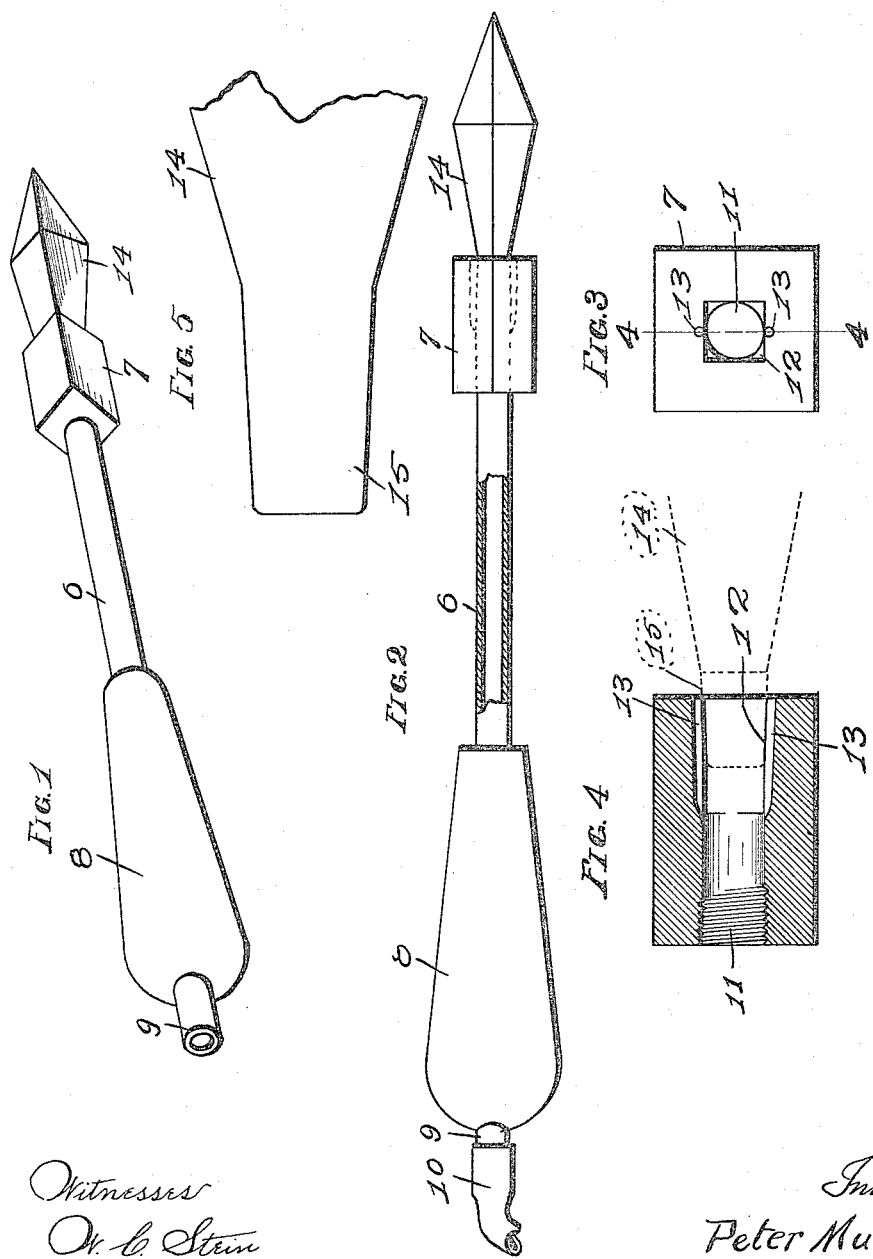

UNITED STATES PATENT OFFICE.

PETER MUNEY, OF ST. LOUIS, MISSOURI.

SOLDERING-IRON.

1,155,433.     Specification of Letters Patent.     Patented Oct. 5, 1915.

Application filed April 20, 1914. Serial No. 833,291.

*To all whom it may concern:*

Be it known that I, PETER MUNEY, a citizen of the United States, and resident of St. Louis, Missouri, have invented certain new and useful Improvements in Soldering-Irons, of which the following is a specification.

This invention relates to improvements in a soldering iron, and has for its object, to provide a soldering iron with a removable tip, so that different kinds of work may be done without having a number of irons in the fire.

A further object is to provide a soldering iron, which is heated by gas or some similar heating fluid, thereby obviating the use of a furnace in heating the iron, and also the necessity of changing irons, due to the cooling of the same while in use.

A further object is to provide a soldering iron so that several different sized tips, according to the work to be done, may be carried in a small package, doing away with the necessity of carrying a lot of clumsy handles around.

Figure 1 is a perspective view of the device embodying my invention. Fig. 2 is a side view of the same with portions broken away and in section, and also showing the fuel connection means. Fig. 3 is an end view of the combined burner and soldering tip socket. Fig. 4 is a sectional view of the same, taken on the line 4—4 of Fig. 3. Fig. 5 is an enlarged fragmental view showing the formation of the socket and of the soldering tip.

In the construction of my device, I provide a tube 6, one end of which is screw-threaded into the burner, and tip socket 7; near the other end of the tube 6 I place the handle 8; over the extremity 9 of the tube 6 is placed a hose or other flexible connection 10, which in turn is attached to any suitable source of fuel supply; the tip socket 7 is supplied with a screw-threaded bore 11, and a tapered rectangular bore 12. Along two sides of the tapered rectangular bore 12 are formed jet openings 13.

Within the burner 7 is seated the soldering tip 14 having a tapered portion 15, which fits within the bore 12, the balance of the tip being of the regulation shape.

The operation of my device is as follows: The operator having turned on the fuel supply lights the fuel as it issues from the jets 13; this causes the flame to be directed against two sides of the soldering tip, and in a very short time the tip is heated sufficiently for use; the fuel supply is then turned down, only sufficient fuel being used to supply the heat, which is naturally lost by radiation, thus the one iron may be used continuously without having recourse to two or three irons in a furnace to take place of the one being used, as soon as it has cooled off.

A device of this kind is especially useful in a tin ware factory where there is a great deal of soldering being done, in fact some employees there doing nothing but soldering from morning until night, and it furthermore has the advantage of doing away with the intense heat and obnoxious fumes which are found to be generated when a gas or charcoal furnace is used for heating the iron, besides doing away with the danger of over-heating the iron.

Having fully described my invention, what I claim is:

A soldering iron comprising a tube, a handle located near one end of said tube, a rectangular burner located on the other end of the tube, a tapered rectangular recess formed in the end of the burner and forming a socket therein, a soldering tip having a tapered rectangular shank seated in the recess and a plurality of openings formed in the sides of the recess of the burner, substantially as specified.

In testimony whereof, I have signed my name to this specification, in presence of two subscribing witnesses.

PETER MUNEY.

Witnesses:
   ALFRED A. EICKS,
   WALTER C. STEIN.